Jan. 24, 1967  B. L. DUFT  3,300,354

METHOD OF MAKING A FILAMENT WOUND SANDWICH CORE

Filed April 18, 1962

INVENTOR.
BUDDY LLOYD DUFT
BY
Jno. J. Posta Jr.

United States Patent Office 3,300,354
Patented Jan. 24, 1967

3,300,354
METHOD OF MAKING A FILAMENT WOUND SANDWICH CORE
Buddy L. Duft, San Diego, Calif., assignor to Whittaker Corporation, a corporation of California
Filed Apr. 18, 1962, Ser. No. 188,361
1 Claim. (Cl. 156—169)

This invention relates to laminated panel structures and more particularly to a honeycomb sandwich structure constructed entirely from a filament winding.

An object of the invention is to provide a novel laminate structure capable of bearing multi-directional loads.

Another object of the invention is to provide a honeycomb sandwich structure which is lightweight and has a high strength-to-weight load bearing capacity.

A further object of the invention is to provide a honeycomb structure having both the facing skins and the cell structure made from the same material.

Still another object of the invention is to provide a honeycomb sandwich structure made entirely out of a single continuous filament.

A still further object of the invention is to provide a new method of manufacturing a honeycomb sandwich structure from a single continuous filament winding.

Yet another object of the invention is to provide a honeycomb sandwich structure which is capable of supporting high circumferential and longitudinal loads in addition to loads normal to the sandwich structure.

In the past, honeycomb sandwich structures were made, for the most part, of two facing skins having a honeycomb core therebetween. The facing skins were generally made of stainless steel or aluminum and the core was formed from a plurality of ribbon-like stainless steel elements joined together by adhesive means and arranged so as to form honeycomb cells. The facing skins were joined to the top and bottom edges of the ribbon-like elements by an adhesive or other means to form the structural laminate. This process involved a plurality of steps including the independent formation of a honeycomb core, the placing of the core on one of the facing skins, the application of adhesive to the edges of the core, the placement of the upper facing skin on the structure. Although this structure had a fair strength-to-weight characteristic for a load placed normal to the surface of the panel, the panel could not efficiently support circumferential or longitudinal loads.

The instant invention comprises a honeycomb sandwich structure constructed from a single continuous filament. The facing skins as well as the core are made from the same filament winding. The presence of the continuous winding and the orientation of the winding in the honeycomb core structure serves to efficiently support not only loads normal to the panel, but also circumferential and longitudinal forces developed in the structure.

The use of a glass filament instead of steel in making the facing skins and honeycomb core results in a decrease in weight without a corresponding relative decrease in strength. The strength-to-weight characteristic is especially important in construction materials used for aircraft, missiles and satellites since a decrease in weight without a corresponding decrease in strengths enable the aircraft to increase the ultimate payload.

The invention will be more readily understood by the following description and by reference to the drawings in which.

In accordance with the present invention, a single filament winding is wound in cylindrical fashion about a tubular mandrel (not shown) to form an inner skin 1 for the honeycomb structure shown generally at 5. After winding the inner skin 1, the same filament winding is wound in a right helical fashion from the left side of the tubular inner skin to the right side, forming a helical pattern thereon. Immediately thereafter, the same filament winding is wound in a left helical fashion from the right to the left, forming a second helical pattern opposite said first helical pattern. The procedure is repeated until several layers of helical patterns are built up on the inner skin 1, forming the sandwich core shown at 2 in FIGURE 1. After forming the sandwich core 2, the same filament winding is wound in cylindrical fashion around the sandwich core 2 to form an outer skin 3 and completely enclose the honeycomb core 2, resulting in the completed structure 5.

Figure 2:
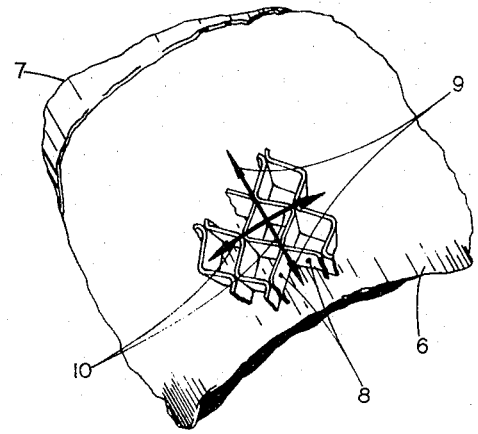
FIGURE 2 is a section of prior honeycomb structure using adhesively bound metallic ribbon elements.

Prior honeycomb structures were constructed as shown in FIGURE 2 and generally consist of an inner face 6 and outer face 7 each made from a sheet of metal, with a plurality of ribbons 8 of metallic foil inserted therein in zig-zag fashion to make a conventional honeycomb core. The outer skin 7 and inner skin 6 are attached to the edges of the ribbon elements by suitable fastening means such as adhesives. The respective crests and valleys of the individual ribbon elements are usually joined to each other at their points of contact by adhesive means. The honeycomb structure of FIGURE 2 has a good weight-to-load bearing characteristic for loads applied perpendicular to the facing skins due to the inherent strength of the honeycomb core. However, this structure's ability to support unevenly applied longitudinal forces such as are shown at 9 is limited by the shear strength of the particular adhesive used to join the respective metallic ribbons together. Similarly, its ability to withstand hoop tension stresses as shown at 10 is also limited by the shear strength of the adhesive used to join the respective metallic ribbons together. This dependence on the shear strength of the adhesive used severely limits the overall strength of this type of honeycomb core structure.

Figure 1:
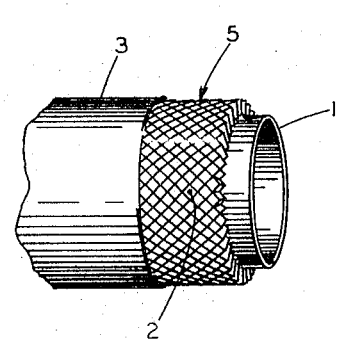
FIGURE 1 is a perspective view of the entire structure with part of the outer skin removed for clarity.
Figure 3:
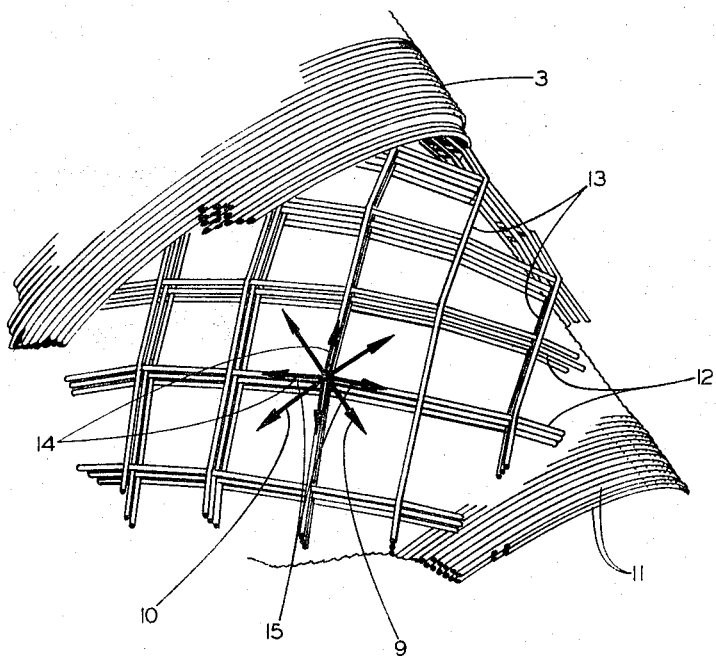
FIGURE 3 is a detailed view of a section of the honeycomb core of FIGURE 1.

FIGURE 3 shows a detailed sectional view of FIGURE 1. The inner skin consists of a plurality of circumferential turns 11 of the same filament. The right helical wound sections of the filament are shown at 12 and the left helical wound sections of the filament are shown at 13. The outer skin shown at 3 is wound in a circumferential manner similar to the inner skin. With this construction the longitudinal forces developed as at 9 are directly supported by a plurality of sections of the same filament, as at 14. Similarly, the hoop tension forces 10 developed in the honeycomb core are also supported by another plurality of sections 15 of the same filament. The lack of dependence upon any shear strength of an adhesive used in the construction of the honeycomb core results in the fact that the only strength limitation to the respective longitudinal and hoop forces developed is the strength of the material forming the honeycomb core itself. Furthermore, due to the presence of the plurality of elongated filament strands, the forces are distributed more thoroughly throughout the entire body.

It should be noted that honeycomb core construction by spirally wound filaments results in a core having a plurality of cells therein. Since the cells themselves are void of material, a lighter body is constructed without a corresponding decrease in strength due to the smaller amount of material present therein, resulting from the strength inherent in honeycomb core sandwich construction. Furthermore, the ability to use a single continuous filament to construct the entire honeycomb sandwich core results in increased strength along with increased ease of fabrication.

The particular filament employed can be of any material, including nylon, glass or wire strands. The filament might also be constructed from a plurality of rovings to increase the strength of the single continuous composite filament without departing from the scope of the invention.

It is further contemplated that various adhesive means could be employed to bind the adjoining filaments one to another. For example, the filament can be coated with a curable adhesive before making the honeycomb sandwich structure and can later be cured by suitable means such as heating to enable the individual filament sections to remain in place.

Furthermore, the cylindrical form set forth in the drawings is not meant to limit the scope of the invention to cylindrical bodies alone, inasmuch as it is readily seen how the form can be of any shape desired, such as elliptic or one having an undulating skin configuration.

Other and different embodiments of the invention are possible and applicant intends to limit the scope of his invention only by the following claim.

I claim:

The method of making a composite, homogeneous, load bearing and lightweight cylindrical structure having an inner layer, an outer layer and a honeycomb core structure interposed between said inner and outer layer, comprising coating a single, continuous filament with a curable adhesive, winding the continuous filament about a cylindrical mandrel in a circumferential manner to form an inner layer, winding the continuous filament over the inner layer in a spiral fashion in a first direction along the length of the inner layer to form a first spiral layer, winding the continuous filament over the inner layer in a spiral fashion in a second direction along the length of the inner layer, said first direction being directly opposite said second direction, winding the continuous filament in a spiral fashion in said first direction along the length of the inner layer to form a third spiral layer, said third spiral layer being positioned above and in line with said first spiral layer, winding the continuous filament in a spiral fashion in said second direction along the length of the inner layer to form a fourth spiral layer, said fourth spiral layer being positioned above and in line with said second spiral layer, repeating the spiral winding until a plurality of aligned spiral layers are built up, whereby a honeycomb core is formed, winding the continuous filament about the honeycomb core in a circumferential manner to form an outer layer, and curing the adhesive to form a solid, composite structure.

References Cited by the Examiner

UNITED STATES PATENTS

| 2,815,043 | 12/1957 | Kleiner et al. | 156—195 |
| 2,843,153 | 7/1958 | Young | 156—195 |
| 3,023,135 | 2/1962 | Wiltshire | 156—195 |

FOREIGN PATENTS

| 479,839 | 2/1938 | Great Britain. |

EARL M. BERGERT, *Primary Examiner.*

H. F. EPSTEIN, *Assistant Examiner.*